United States Patent [19]

Tacchi

[11] 4,376,436
[45] Mar. 15, 1983

[54] HOUSEHOLD HOT WATER SYSTEMS

[76] Inventor: Victorio Tacchi, 50 Rioja St., 1st Floor, Cordoba, Argentina

[21] Appl. No.: 178,732

[22] Filed: Aug. 18, 1980

[30] Foreign Application Priority Data

Aug. 28, 1979 [AR] Argentina .................... 277,878

[51] Int. Cl.³ ................................................. F24J 3/02
[52] U.S. Cl. .................................... 126/437; 126/432; 126/422
[58] Field of Search ............... 126/422, 437, 435, 427, 126/432, 416; 237/19; 137/2, 14, 255, 256, 263

[56] References Cited

U.S. PATENT DOCUMENTS

| 819,342 | 5/1906 | Cunniff | 126/432 |
| 4,019,495 | 4/1977 | Frazier et al. | 126/422 X |
| 4,048,981 | 9/1977 | Hobbs | 126/422 X |
| 4,052,000 | 10/1977 | Honikman | 126/422 |
| 4,096,861 | 6/1978 | Bowles | 126/422 |
| 4,232,656 | 11/1980 | Teagan | 126/437 X |

Primary Examiner—Larry Jones
Attorney, Agent, or Firm—Fleit, Jacobson & Cohn

[57] ABSTRACT

An arrangement for combination with the conventional hot water system of a house or building in which the water is conventionally heated and stored in a tank, the arrangement comprising a solar energy panel (at an upper level) with a thermostatic valve and a supplementary cold water tank, connected into the system in such a way that hot water is transferred, without the use of a pump, from the solar panel to the hot water tank for storing therein ready for use (at a lower level), thus reducing the energy requirements for heating the water by the conventional means of the hot water system.

8 Claims, 3 Drawing Figures

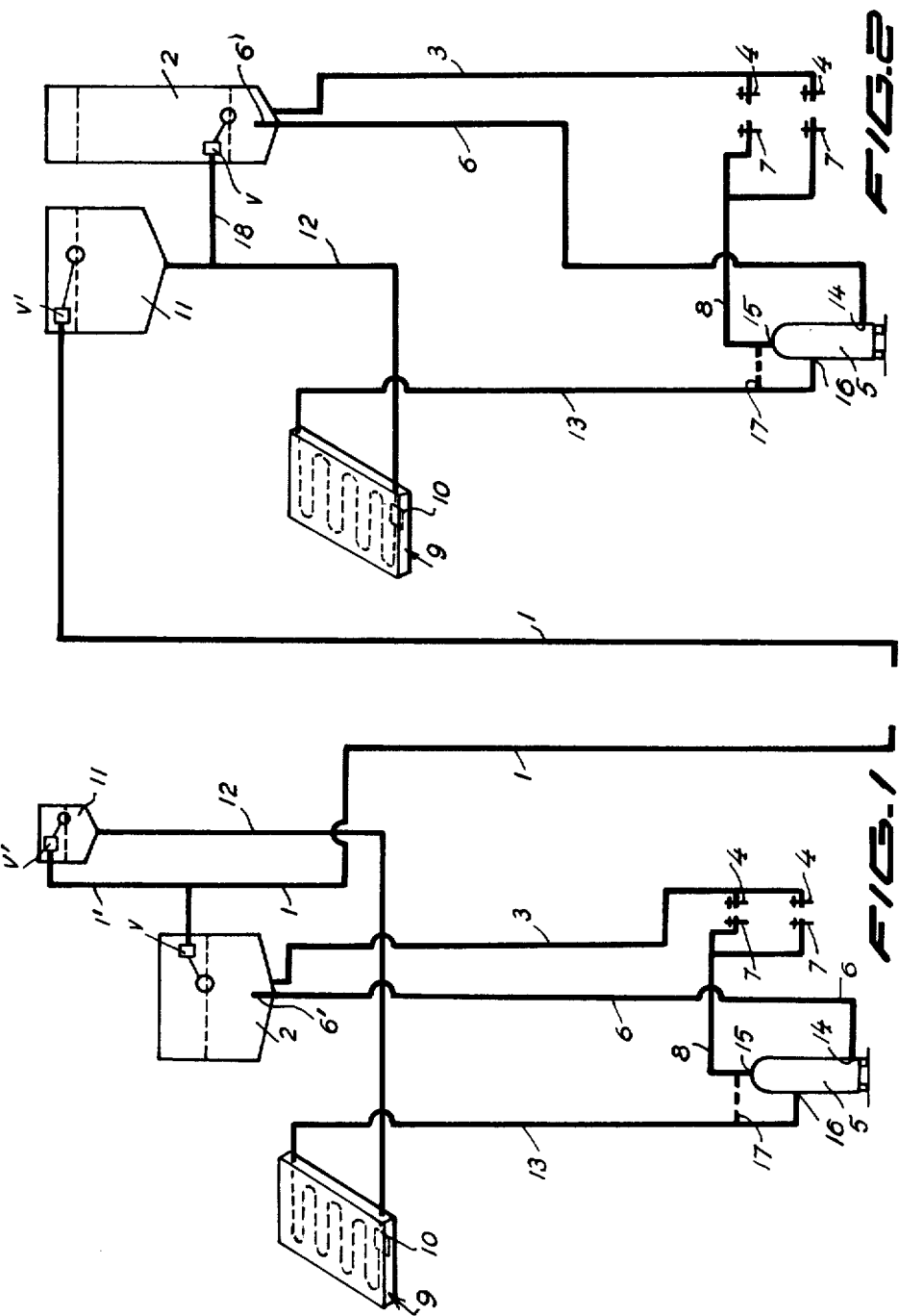

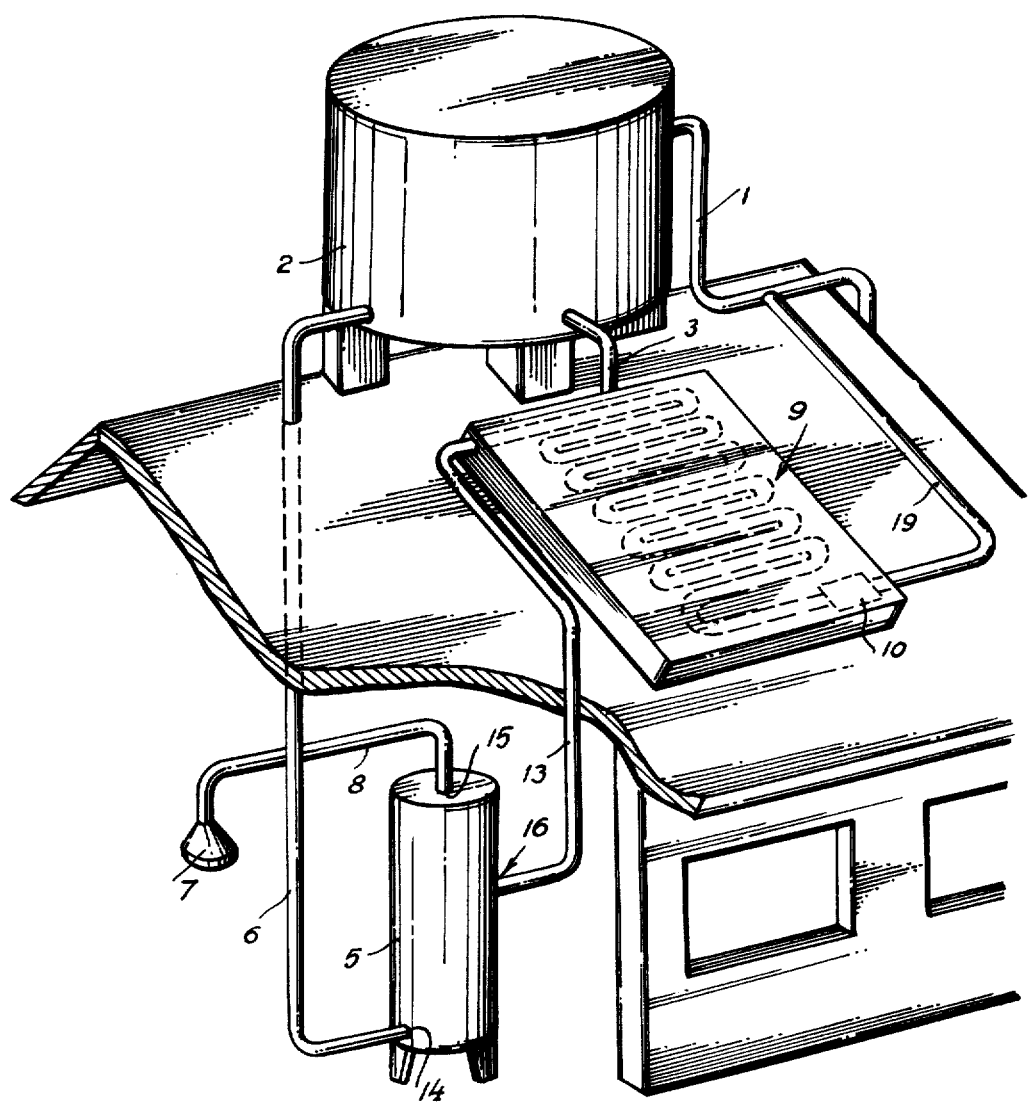

HOUSEHOLD HOT WATER SYSTEMS

BACKGROUND OF THE INVENTION

Field of the Invention

The present invention relates in general terms to the heating of water by solar energy and more particularly to an arrangement for use in combination with the conventional hot water system of a house or building, for heating water by solar energy and transferring the water so heated at an upper level to a lower level, without the use of pumps, for storing in the hot water tank of the conventional system and thus reducing the fuel or energy consumption requirements of the latter.

In accordance with the teachings of the present invention it is possible to transfer water heated in a solar energy receiving panel positioned on the roof of a building to a conventional hot water tank positioned at a lower level and forming part of the hot water system of the building, without resorting to pumps and merely by taking advantage of gravity.

The invention has been particularly conceived for combination with a conventional hot water system, in which the water is heated and stored in an electric or fuel fed, thermally insulated, combined water heater and storage tank of the type manufactured by Rheem International, Inc.

However, the invention can also be used in a system having an instantaneous water heater (wherein the water is heated as it is being consumed), in which case a hot water storage tank should be provided for storing the water heated in the solar panel.

It is a known fact that the so called energy crisis has made it necessary to reduce the consumption of conventional energy (that derived from oil or natural gas) and resort to nonconventional heat sources such as solar energy.

The aim of the present invention is to complement a conventional water heating system with a solar energy panel so that the consumption of fuel for heating the water is only required when there is an extreme demand for hot water or when the solar energy is insufficient for heating the water normally consumed.

A further aim of the present invention is to achieve the previously mentioned aim by an extremely simple arrangement and without resorting to control elements, complicated temperature sensors, pumps etc. as would be required by the obvious arrangements for achieving said previously mentioned aim.

Some of the important features of the present invention are:

(1) The fluid used to transport heat from the solar energy panel is the water to be consumed in the building;
(2) The water circuit is of the open circuit type;
(3) No reliance is made on pumps or the like;
(4) The energy required to transfer heat from an upper level (solar energy panel) to a lower level (hot water tank and taps) is obtained by the pressure difference provided by the cold water supply;
(5) The hot water installation herein proposed is just as simple as a conventional hot water system;
(6) Conventional solar energy panels, thermostatic valves, tanks, etc. can be used;
(7) The volume of water used to transfer heat from the solar panel to the hot water storage tank remains in the system because it causes a backflow of an equivalent volume of cold water into the cold water storage tank.

SUMMARY OF THE INVENTION

In accordance with the present invention there is provided an arrangement for transferring heat by means of water heated by solar energy at an upper level, to a lower level for use thereat, the arrangement comprising:

(1) a water tank positioned at a first level; said water tank being adapted to receive water from the cold water supply mains, said tank having an outlet;

(2) a panel for heating water by solar energy, said panel having a cold water inlet and a hot water outlet; said cold water inlet being connectible to a source of cold water at a pressure greater than the pressure created by the level of said water tank;

(3) a water heating and storing arrangement positioned at a level below said first level and having a hot water outlet, a hot water inlet and a cold water inlet, said hot water outlet being adapted to supply hot water for use upon demand, the hot water having been heated by said panel or in absence of the provision of hot water therefrom by conventional heating in said heating and storing arrangement;

(4) a conduit connecting the hot water outlet of said panel with the hot water inlet of said hot water storing arrangement;

(5) a conduit connecting the outlet of said water tank to said cold water inlet of said water heating and storing arrangement; and (6) a thermostatic control valve in said panel for controlling the flow of water as a function of the temperature of the water.

BRIEF DESCRIPTION OF THE DRAWINGS

FIG. 1 is a circuit diagram of a conventional hot and cold water system for a house or building and in which the improvement according to one of the embodiments of the present invention has been made.

FIG. 2 is also a circuit diagram of a conventional hot and cold water system for a house or building and in which the improvement according to another of the embodiments of the present invention has been made.

FIG. 3 is a schematic perspective view of an arrangement according to the present invention but showing an alternative embodiment.

DESCRIPTION OF THE PREFERRED EMBODIMENTS

In the drawings, the arrows represent the possible directions of water flow.

In FIG. 1 the cold water inlet to the system is through a pipe 1 which connects the water mains (not shown) to the cold water tank 2 positioned at a given level, at the higher part of the house or building so as to create thereby a water head for the flow of water in the system. Overflow of tank 2 is prevented by a valve V, controlling the ingress of water to the tank from pipe 1 as a function of the level of water in the tank (conventional).

Tank 2 is connected by pipe 3 to the cold water taps 4 of the house or building and to the cold water inlet, by a pipe 6, of a water heating and storing tank 5 positioned at a level below the level of tank 2. Pipe 6 is not fed from the bottom of tank 2, but from a slightly higher level, such as shown at 6', so as to prevent backflowing hot water from being fed into cold water pipe 3.

The hot water outlet of water heating and storing tank 5 is connected to the hot water taps 7 of the house or building by a pipe 8 whereby tank 5 can supply hot water for household use, upon demand.

According to the present invention the system so far described is improved in accordance with this embodiment by a panel 9 for heating water by solar energy, by a thermostatic control valve 10 and by a supplementary cold water tank 11 for causing the flow of water through the panel 9, all of which will be described in more detail hereinbelow together with their complementary components. Also in accordance with the present invention it may be necessary to lower the maximum level of water in tank 2 as determined by the float valve V therein.

Cold water tank 11 is positioned at a given level above the level of cold water tank 2 and also receives cold water from the mains by pipe 1' which is an extension of pipe 1. A conventional float valve V' responsive to water level is also provided in tank 11 to prevent overflow.

The outlet from tank 11 is connected by a pipe 12 to the cold water inlet to panel 9, while the hot water outlet from panel 9 is connected to water heating and storing tank 5 by pipe 13.

As conventional gas or electric water heating and storing tanks 5 are only provided with a cold water inlet 14 and a hot water outlet 15, it is necessary to incorporate by any known means, a hot water inlet 16 for connection to pipe 13. It will be evident that it is advisable to position the hot water inlet 16 for pipe 13 in the upper part of tank 5 so as to take maximum advantage of the temperature stratification of water in tank 5.

Thermostatic valve 10 is an adjustable thermostatic valve (DANFOSS-MODEL AVTB having a temperature range from 20° to 60° C. or from 50° to 90° C.) and is positioned within the flow of water into or from panel 9 so as to only permit the flow of water through panel 9 when the water has reached a certain temperature. Thermostatic valve 10 is provided with a temperature detector positioned in good heat transfer relationship with the hotest portion of panel 9. In this way, valve 10 will remain closed during absence of solar energy and will become opened when panel 9 receives solar energy sufficient to heat the water therein up to the temperature at which the thermostatic valve 10 has been set.

As shown at 17 in FIG. 1, the hot water from panel 9 can be fed into tank 5 through the conventional upper hot water outlet 15 to which pipe 8 is connected, in which case pipe 13 feeds directly into hot water inlet 15 through pipe 17.

The operation of the FIG. 1 embodiment is the following: Cold water enters the system from the cold water mains and is fed into tanks 2 and 11.

If thermostatic valve 10 is open, the level at which tank 11 is positioned will cause cold water to flow from this tank 11 to panel 9, whereat it will be heated and fed into tank 5 where it will become accumulated at its upper part. The volume of hot water arriving at tank 5 will displace an equivalent volume of cold water towards tank 2. This is the backflow which makes it necessary to provide a considerable space above the water level in tank 2, to which effect the normal maximum water level in tank 2 may have to be lowered by adjusting its float valve V. The volume of the space above the water in tank 2 is established on the basis of the heating power of solar panel 9 and the selected temperature at which valve 10 is to open, the higher the temperature the less volume of water needed to transfer heat from panel 9 to tank 5 and therefore the volume of the space in tank 2 can be smaller. If an abundant consumption of hot and cold water is foreseen, the volume of said space can be small.

The cold water accumulated in tank 2 is used to supply the cold water taps or to feed water into tank 5 and create the necessary pressure therein to force hot water to the hot water taps when valve 10 is closed.

The difference in level between tanks 2 and 11 provides the necessary energy to cause flow of water by overcoming friction and the difference in specific gravity between the hotter water column 13 and the colder water column 6.

When valve 10 is closed the system operates as a conventional water system since the circuit through panel 9 is interrupted.

It has been found that panel 9 can be positioned with its upper portion at any level from a few centimeters below the level of tank 11, to ground level.

When it is foreseen that there will be no use of water during a lengthy period of time, it is necessary to close-off the flow of water to panel 9 so as to avoid excessive backflow of water to tank 2 and overflow thereof. If the flow of water through panel 9 is restricted or shut off it is also necessary to empty the water out of solar panel 9 (a) so as to avoid boiling of the water therein, if there is solar energy available, and (b) so as to prevent freezing of the water in the panel if there are low temperatures and no solar energy is received.

The volume of tank 11 can be small (approximately 20 liters) if the water supplied from the mains is sufficient to compensate the water required for transferring heat from panel 9 to tank 5, that is to say, the backflow of water into tank 2. By using a solar panel of 1.8 m$^2$ and if the solar energy received is 1.5Ly with a cold water inlet temperature of 20° C. to the panel, and a hot water outlet temperature of 55° C. from the panel, and a panel efficiency of 50%, the volume of water transferred from panel 9 to tank 5 and from tank 5 to tank 2 is approximately 22 liters per hour. If the water supplied from the mains were irregular, the volume of tank 11 must be estimated on the basis of the transfer of hot water from panel 9 to tank 5. In the previous example, if solar energy is received during 9 hours, at a maximum average 1 cal/cm$^2$.min. (most unlikely) the volume of water in tank 11 should be approximately 140 liters if there is no supply of cold water from the mains through pipe 1 into tank 11 during the mentioned period of time.

If the water heated by solar energy is only used during the night, for the example given above, the volume of tank 2 for receiving the backflow of water from tank 5, should also be 140 liters. Preferably tank 5 should also have a 140 liters capacity.

A slight modification of the embodiment of FIG. 1 may be necessary when the cold water mains are able to supply pipe 1 with sufficient water pressure, but an insufficient volume of water to keep tank 11 full. In this event, I have found that it is advisable to connect pipe 1 to tank 11 and not to tank 2; in order to keep tank 2 supplied with water, an outlet of tank 11, positioned at a level above that connected to pipe 12, is connected to the water inlet of tank 2 through valve V.

The embodiment of FIG. 2 will now be described although specific reference will only be made to those features which cause it to be different from the embodiment of FIG. 1.

In this embodiment the cold water mains are connected through pipe 1 only to tank 11, while the water inlet of tank 2 is fed from the outlet of tank 11 by pipe 18, through valve V.

The level of water in tank 2 is maintained by float valve V at a level of for example 1.5 meters below the minimum level of water in tank 11. As tank 2 supplied the water head for the hot and cold water consumed at the taps, and as the pressure created by the level of tank 2 is relatively small, pipe 18 and valve V should be overdimensioned with regard to pipe 1 and valve V'.

The operation of the FIG. 2 embodiment is the same as that of the FIG. 1 embodiment and therefore it will not be described again.

The important advantage of the FIG. 2 embodiment is that if tank 2 is sufficiently tall, as schematically represented in this figure, so that the top thereof is above the level of the highest level of water possible in tank 11 (shown in dotted lines), then the backflow of water from tank 5 will become progressively less as the level of water in tank 2 rises, since this backflow is only created by the difference in level of the water in tanks 11 and 2. In this way this embodiment provides a self-regulating feature which is most important during the absence of consumption of cold and hot water and which in the embodiment of FIG. 1 requires the inclusion of means to avoid this backflow if the overflow (of tank 2) is to be prevented.

Reference will now be made to the embodiment of FIG. 3 which shows a simplified arrangement which also includes a panel 9 for heating water by solar energy, and a thermostatic control valve 10. The remaining components are all conventional and the basic difference between the embodiments of FIGS. 1 and 2 is that a supplementary cold water tank such as shown at 11 in FIGS. 1 and 2, is not provided in this embodiment. According to this embodiment the water pressure which is necessary to cause flow of water through panel 9 is provided directly from the mains (not shown) by a pipe 19 between pipe 1 and the cold water inlet to panel 9.

As the pressure in the mains is always higher than the pressure difference created by the level of tank 2, cold water will be caused to flow (when valve 10 is open) through panel 9 into water heating and storing tank 5 for storage therein and use, when desired, at taps 7.

Obviously this embodiment requires that the pressure and volume of water available from the mains are adequate; this is not always the case in fast growing areas. If the water supplied from the mains should be insufficient to assure adequate pressure for causing the flow of water through panel 9 into tank 5, then the embodiments of FIGS. 1 and 2, with their alternatives, can be used.

It will be seen that in the embodiments of FIGS. 1 and 2 tanks 11 constitute a source of cold water at a pressure greater than the pressure created by the level of water in tanks 2, while in the embodiment of FIG. 3 the mains constitute said source of cold water at a pressure above that of tank 2.

I claim:

1. Arrangement for transferring water heated by solar energy at an upper level, to a lower level for use thereat, the arrangement comprising:

(1) a water tank positioned at a first level; said tank being adapted to receive water from cold water supply mains, said tank having an outlet;

(2) means for heating the water and comprising a solar energy receiving panel, said water heating means having a cold water inlet and a hot water outlet; said cold water inlet being connectable to a source of cold water at a pressure greater than the pressure created by the level of water in said water tank;

(3) a water heating and storing arrangement positioned at a level below said first level and having a hot water outlet, a hot water inlet and a cold water inlet, said hot water outlet being adapted to supply hot water for use upon demand, the hot water having been heated by said solar energy or, in absence of the provision of solar energy, by conventional heating in said heating and storing arrangement;

(4) a first conduit connecting the hot water outlet of said water heating means with the hot water inlet of said water heating and storing arrangement;

(5) a second conduit having an end portion connected to the outlet of said water tank and an end portion connected to said cold water inlet of said water heating and storing arrangement so that water is flowable into said second conduit from said water heating and storing arrangement when hot water is introduced into said water heating and storing arrangement through said hot water inlet; and (6) a thermostatic control valve in said water heating means for controlling the flow of water as a function of the temperature of the water.

2. Arrangement as claimed in claim 1, wherein the hot water outlet and the hot water inlet of said water heating and storing arrangement are coincident.

3. Arrangement for transferring heat by means of water heated by solar energy at an upper level, to a lower level for use thereat, the arrangement comprising:

(1) a first water tank positioned at a first level;

(2) a second water tank having at least a portion thereof positioned at a second level below said first level, said water tanks being adapted to receive water from cold water supply mains, each one of said tanks having an outlet;

(3) means for heating the water and comprising a solar energy receiving panel, said water heating means having a cold water inlet and a hot water outlet;

(4) a first conduit connecting the outlet of the first tank to the cold water inlet of the water heating means;

(5) means for storing hot water previously heated by a source other than solar energy, said storing means being positioned at a level below said second level and having a hot water outlet, a hot water inlet and a cold water inlet, said hot water outlet being adapted to supply hot water for use upon demand, the hot water having been heated by solar energy or in absence of the provision of solar energy by said source other than solar energy;

(6) a second conduit connecting the hot water outlet of said water heating means with the hot water inlet of said means for storing hot water;

(7) a third conduit having an end portion connected to the outlet of said second water tank and an end portion connected to said cold water inlet of said means for storing hot water so that water is flowable into said third conduit from said means for storing hot water when hot water is introduced into said means for storing hot water through said hot water inlet; and (8) a thermostatic control valve in said water heating means for controlling the flow of water as a function of the temperature of the water.

4. Arrangement as claimed in claim 3, wherein the hot water outlet and the hot water inlet of said water heating and storing arrangement are coincident.

5. Arrangement for transferring heat by means of water heated by solar energy at an upper level, to a lower level for use thereat, the arrangement comprising:

(1) a first water tank positioned at a first level;
(2) a second water tank having at least a portion thereof positioned at a second level below said first level, said water tanks being adapted to receive water from cold water supply mains, each one of said tanks having an outlet;
(3) means for heating water by solar energy, said water heating means having a cold water inlet and a hot water outlet;
(4) a first conduit connecting the outlet of the first tank to the cold water inlet of the water heating means;
(5) a heating and storing tank for hot water positioned at a level below said second level and having a hot water outlet, a hot water inlet and a cold water inlet, said hot water outlet being adapted to supply hot water for use upon demand, the hot water having been heated by said water heating means or, in absence of the provision of solar energy, by conventional heating in said heating and storing tank;
(6) a second conduit connecting the hot water outlet of said water heating means with the hot water inlet of said heating and storing tank;
(7) a third conduit having an end portion connected to the outlet of said second water tank and an end portion connected to said cold water inlet of said heating and storing tank so that water is flowable into said third conduit from said heating and storing tank when hot water is introduced into said heating and storing tank through said hot water inlet; and
(8) a thermostatic control valve in said water heating means for controlling the flow of water as a function of the temperature of the water.

6. Arrangement as claimed in claim 5, wherein said second water tank receives water from said mains through said first water tank; said second water tank extends upwardly to such an extent that the maximum level of water therein is the same as the maximum level of water in said first water tank, for self-regulating the flow of water through said water heating means.

7. In a household water installation comprising a cold water tank having an outlet positioned at a level above the highest water outlet of a house, a water heating and storing arrangement for heating water by conventional energy and storing the heated water therein, said arrangement being positioned at a level below the level of said cold water tank and conduits connecting the cold water tank to a source of cold water, to cold water outlets of the house, and to the water heating and storing arrangement, the improvement comprising:

(1) a complementary cold water tank adapted to receive cold water from the cold water source and having an outlet positioned above the level of and connected to said water heating and storing arrangement;
(2) means for heating water by solar energy, said water heating means being connected to receive cold water from one of said cold water tanks and being positioned at a level above the level of said water heating and storing arrangement;
(3) a thermostatic valve for controlling flow of water through said water heating means as a function of the temperature of the water; and
(4) a hot water inlet provided in said water heating and storing arrangement and connected to receive hot water from said water heating means, the other of said cold water tanks being connected to said water heating and storing arrangement in such manner that water is flowable out of said water heating and storing arrangement into said other of said cold water tanks when hot water is introduced into said water heating and storing arrangement.

8. An arrangement according to claim 1, 3, or 5, wherein said water heating means comprises a solar energy panel.

* * * * *